United States Patent
Croxford et al.

(10) Patent No.: US 11,928,581 B2
(45) Date of Patent: Mar. 12, 2024

(54) SYSTEM AND METHOD FOR COMPRESSING KERNELS

(71) Applicants: Apical Ltd, Cambridge (GB); Arm Limited, Cambridge (GB)

(72) Inventors: Daren Croxford, Swaffham Prior (GB); Jayavarapu Srinivasa Rao, Cambridge (GB); Sharjeel Saeed, Cambridge (GB)

(73) Assignee: Arm Limited, Cambridge (GB)

(*) Notice: Subject to any disclaimer, the term of this patent is extended or adjusted under 35 U.S.C. 154(b) by 1361 days.

(21) Appl. No.: 16/132,015

(22) Filed: Sep. 14, 2018

(65) Prior Publication Data

US 2020/0090032 A1    Mar. 19, 2020

(51) Int. Cl.
  *G06N 3/08* (2023.01)
  *G06N 3/04* (2023.01)

(52) U.S. Cl.
  CPC .............. *G06N 3/08* (2013.01); *G06N 3/04* (2013.01)

(58) Field of Classification Search
  CPC ..................... G06N 3/08; G06N 3/04
  See application file for complete search history.

(56) References Cited

U.S. PATENT DOCUMENTS

| | | | | |
|---|---|---|---|---|
| 5,008,752 A * | 4/1991 | Van Nostrand | ....... | G06T 3/4007 348/581 |
| 5,959,693 A * | 9/1999 | Wu | ............ | H04N 5/21 348/625 |
| 6,587,537 B1 * | 7/2003 | Hsieh | ............ | G06T 11/005 378/4 |
| 7,359,576 B1 * | 4/2008 | Worthington | ............ | G06T 5/20 382/210 |
| 2003/0068085 A1 * | 4/2003 | Said | ............ | G06T 7/12 382/199 |
| 2005/0230641 A1 * | 10/2005 | Chun | ............ | H04N 13/139 348/E13.043 |
| 2009/0129636 A1 * | 5/2009 | Mei | ............ | H04N 1/3877 382/118 |
| 2013/0016784 A1 * | 1/2013 | Sikora | ............ | G06T 7/20 382/107 |
| 2013/0322752 A1 * | 12/2013 | Lim | ............ | G06T 5/002 382/167 |
| 2016/0342893 A1 * | 11/2016 | Ross | ............ | G06N 5/04 |
| 2016/0358068 A1 * | 12/2016 | Brothers | ............ | G06N 3/082 |
| 2017/0034453 A1 * | 2/2017 | Usikov | ............ | G06V 40/10 |
| 2018/0293552 A1 * | 10/2018 | Zhang | ............ | G06N 5/01 |
| 2019/0122115 A1 * | 4/2019 | Wang | ............ | G06T 7/337 |

(Continued)

OTHER PUBLICATIONS

Sedighi—(Histogram Layer, Moving Convolutional Neural Networks Towards Feature-Based Steganalysis—2017) (Year: 2017).*

(Continued)

*Primary Examiner* — Omar F Fernandez Rivas
*Assistant Examiner* — Shamcy Alghazzy
(74) *Attorney, Agent, or Firm* — EIP US LLP

(57) ABSTRACT

A method of compressing kernels comprising detecting a plurality of replicated kernels. The plurality of replicated kernels comprise kernels. The method also comprises generating a composite kernel from the replicated kernels. The composite kernel comprises kernel data and meta data indicative of the rotations applied to the composite kernel data. The method also comprises storing a composite kernel.

17 Claims, 5 Drawing Sheets

(56) References Cited

U.S. PATENT DOCUMENTS

2019/0171926 A1* 6/2019 Chen ................. G06N 3/04
2019/0340488 A1* 11/2019 Fishel ................. G06N 3/063

OTHER PUBLICATIONS

Li—(An Efficient Deep Convolutional Neural Networks Model for Compressed Image Deblocking—2017) (Year: 2017).*
Mai—Kernel Fusion for Better Image Deblurring (Year: 2015).*
Szafranski—Composite Kernel Learning (Year: 2009).*
Li—An_efficient_deep_convolutional_neural_networks_model_for_compressed_image_deblocking (Year: 2017).*
Sedighi—HistogramFinal (Year: 2017).*
Gretton—Optimal kernel choice for large-scale two-sample tests (Year: 2012).*

* cited by examiner

SYSTEM AND METHOD FOR COMPRESSING KERNELS

BACKGROUND OF THE INVENTION

Technical Field

The present disclosure relates to a method and system for compressing kernels. More particularly, compressing kernels for use with a convolutional neural network, wherein the kernels exhibit cyclic rotation.

Background

A system may be used to compress kernels with convolutional neural networks. It is desirable to reduce the network's memory footprint, the amount of data to be fetched, and the number of memory fetches. It is also desirable to reduce the power consumption of such systems.

SUMMARY

According to a first aspect of the present disclosure, there is provided a method of compressing kernels; the method comprising detecting a plurality of replicated kernels; generating a composite kernel from the replicated kernels, the composite kernel comprising kernel data and meta data; and storing the composite kernel.

According to a second aspect of the present disclosure, there is provided a system for compressing kernels, the system comprising a detection module for detecting a plurality of replicated kernels; a generation module for generating composite kernels from the replicated kernels; and storage for storing the composite kernels.

According to a third aspect of the present disclosure, there is provided a non-transitory computer-readable storage medium comprising computer-executable instructions stored thereon which, when executed by at least one processor, cause the at least one processor to compress kernels the instructions comprising detecting a plurality of replicated kernels; generating a composite kernel from the replicated kernels, the composite kernel comprising kernel data and meta data; and storing the composite kernel.

BRIEF DESCRIPTION OF THE DRAWINGS

Further features and advantages will become apparent from the following description of preferred embodiments, given by way of example only, which is made with reference to the accompany drawings in which like reference numerals are used to denote like features.

DETAILED DESCRIPTION OF CERTAIN EMBODIMENTS

Figure 1:
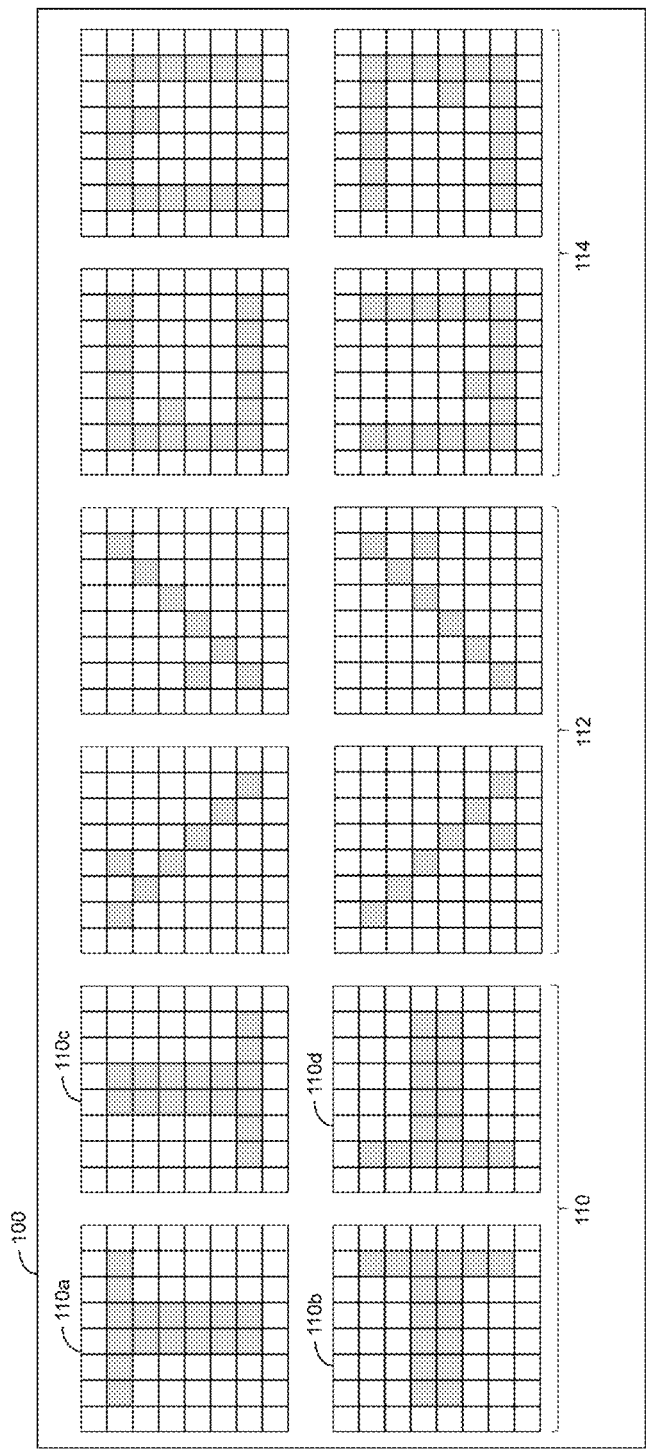
FIG. 1 is a representation of kernel data according to examples.

Details of systems and methods according to examples will become apparent from the following description with reference to the Figures. In this description, for the purposes of explanation, numerous specific details of certain examples are set forth. Reference in the specification to 'an example' or similar language means that a feature, structure, or characteristic described in connection with the example is included in at least that one example but not necessarily in other examples. It should be further notes that certain examples are described schematically with certain features omitted and/or necessarily simplified for the ease of explanation and understanding of the concepts underlying the examples.

Convolutional neural networks typically comprise an input layer, a plurality of convolutional layers, a number of fully connected layers and an output layer. The input layer for example corresponds with an input to the neural network, such as image data. The convolutional layers are arranged to extract particular features from the input data to create feature maps and may only operate on a small portion of the input data. The fully connected layers then use the feature maps for classification.

In general, neural networks, such as the one described above, may undergo a training phase, in which the neural network is trained for a particular purpose. The internal state of a neuron within the neural network (sometimes referred to as the activation) typically depends on an input received by the neuron. The output of said neuron then depends on the input, kernel, bias, and the activation. The output of some neurons is connected to the input of other neurons, forming a directed, weighted graph in which edges (corresponding to neurons) or vertices (corresponding to connections) of the graph are associated with weights, respectively. The weights may be adjusted throughout the training altering the output of individual neurons and hence of the neural network as a whole.

When training neural networks one or more kernels are generated. The kernels are associated with at least some of the layers of the network. The kernels, for example allow features of an image to be identified. Some kernels may be used to identify edges in the input and others may be used to identify horizontal or vertical features in the image (although this is not limiting, and other kernels are possible). The precise features that the kernels identify will depend on the object that the neural network is trained to identify. Kernels may be three dimensional volumes having a width, height and depth, for example 3×3×64.

During supervised training, a training data set is used, the training data set comprises input and output data, and is used to train the neural network by providing the inputs to the network, determining an output, and then comparing the determined output to the known output provided by the training data set.

In general, the more training data items available in the training data set the more accurate a trained neural network will be at identifying features and/or objects. It is not uncommon for training data to be augmented by applying several transformations to the original training data item, thereby expanding the training data set, without the need for obtaining additional training data items. For example, the training data set may be augmented by applying several different transformations to the original training data items, such as rotation, shifting, rescaling, mirroring/flipping, shearing, stretching, adjusting the colour, and adding noise. Expanding the training data set in this way enables the neural network to more accurately classify objects which do not match the training data. For example, when the object to be identified is at a different orientation, under different lighting conditions, and/or a different size to the items in the training data.

As a result of augmenting the training data in such a way, it is not uncommon for the kernels generated to exhibit similar modifications. In particular, when applying rotation transformations to the training data, such as 90-degree rotations, the kernels generated as a result may also exhibit such rotational similarities. This is as a result of the required equivariance the neural network has when considering kernels exhibiting such 90-degree rotations. Therefore, storing kernels which exhibit such similarities requires an increased memory footprint and increases the power consumption of any system arranged to implement the neural network.

Kernels may be compared for such similarities by comparing the entire volume of one kernel with the entire volume of another kernel. Alternatively, kernels may be compare one portion at a time. A kernel may be separated into slices, such as a 3×3×1 slice. Each slice may then be compared against a slice of another kernel volume. For example, the $10^{th}$ slice of one kernel volume may be compared to the $10^{th}$ slice of another kernel volume.

For example, as shown in FIG. 1, there is an exemplary representation of a kernels set 100. The kernel set 100 comprises a plurality of kernels, such as kernels 110a, 110b, 110c, and 110d. The kernels 110a,110b,110c,110d exhibit a 90-degree cyclic rotation. Kernel 110b is a 90-degree clockwise rotation of kernel 110a, kernel 110c is a 180-degree clockwise rotation of kernel 110a, and kernel 110d is a 270-degree clockwise rotation of kernel 110a. The kernel set also comprises a number of other kernels shown as groups 112,114, which also exhibit similar cyclic rotations. It will be appreciated that kernels may exhibit other features, such as being flipped or a mirror of another kernel in the group.

The kernels may be of any size depending on the function of the neural network. The kernels 110a,110b,110c,110d, of FIG. 1 for example are an 8 by 8 matrix, and comprise a plurality of weights, indicated, for the purposes of the figures, by shaded areas.

Figure 2:
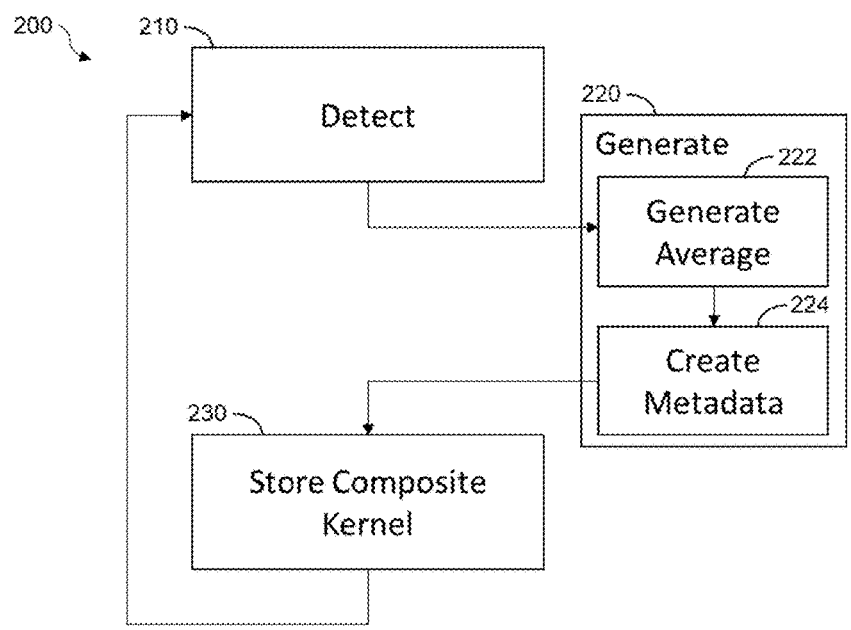
FIG. 2 is a flow diagram showing a kernel compression method for compressing kernels according to examples.

FIG. 2 is a flow diagram showing a kernel compression method 200 for compressing a kernel set according to examples. The kernel compression method 200 may be implemented by a kernel compression system, such as that illustrated schematically in FIGS. 6 and 7 (described below).

At item 210 of FIG. 2, a kernel set, such as kernel set 100 shown in FIG. 1 is processed, and replicated kernels are detected. For example, kernel group 110 may be detected as kernels 110a,110b,110c,110d all exhibit a 90-degree cyclic rotation as discussed above. Once a group of kernels, such as group 110 have been detected, they will be grouped together, and the group is then processed further at the generation step at item 220. In some embodiments, when a group of kernels is detected, such as group 100, the processing order of the kernels 110a,110b,110c,110d may be checked so that the kernels are processed consecutively. This may further reduce the number of memory access as data may be fetched consecutively also.

Item 220 of FIG. 2 takes, as an input, the group of detected kernels, such as group 110 of FIG. 1, and outputs a composite kernel and meta data. The composite kernel may be generated at item 222 by combining the individual kernels of a group, such as group 110 of FIG. 1 to produce a composite kernel representative of an average of the members of the group. In addition to producing a composite kernel representative of the members of the group 110, meta data is also generated at item 224. The meta data indicates whether the kernel exhibits cyclic rotation or other transformation such a being a mirror image of another kernel of a group, and in some embodiments, such as the embodiment described below in relation to FIG. 5, whether any delta kernels are compressed, and if so, aids in the transformation of the composite kernel data back to the original kernel, for example kernels 110a,110b,110c,110d, when the neural network is being implemented, as will be described below. This means that only a single kernel, the composite kernel, needs to be stored along with the meta data indicating whether the kernel is rotated. In some embodiments, this requires an additional 3 bits per kernel resulting in a reduction to the kernel set size by approximately 75%. This will be discussed in further detail below in relation to the examples shown in FIG. 4.

Once the composite kernel has been generated, at item 230 of FIG. 2, it is stored. The composite kernel is added to a new kernel set which comprises all the composite kernels generated from the original kernel set, such as kernel set 100 in FIG. 1. The method then loops back to the detection step at item 210, where the next group of replicated kernels are detected, such as group 112. The method then repeats until all groups of replicated kernels have been detected, and a composite kernel has been generated for each group. In some embodiments, any kernels which are not replicated, and therefore do not exhibit a cyclic rotation with another kernel of the kernel set, may also be added to the new kernel set.

Generating composite kernels as described above and storing them in a new kernel set for use by the neural network during the processing of inputs, reduces the total number of kernels required to be stored in memory for implementing the neural network. This reduces the memory footprint of the neural network, as well as the amount of data that needs to be fetched from the memory, thereby saving power. Furthermore, by storing only the new kernel set, the amount of on-chip memory required is reduced, increasing efficiency and decreasing the number of memory fetches from on-chip memory, thereby resulting in a power saving.

In some embodiments, the generation of composite kernels may be undertaken when the neural network is being trained. For example, during the training process occurrences of rotated kernels may be detected, and then subsequently optimized. Alternatively, a fully trained network may be provided, the rotated kernels will then be detected and optimized, before the network is retrained. Retraining may occur when the neural network is implemented using a neural network accelerator or neural network processor, since the processor may use different data types, such as an 8-bit integer that the trained network, which may use, for example a floating-point data type. In yet other embodiments, a pre-trained network may be provided to a driver, such as the driver described below in relation to FIG. 6. The driver may then detect rotated kernels and optimize the network.

Figure 3:
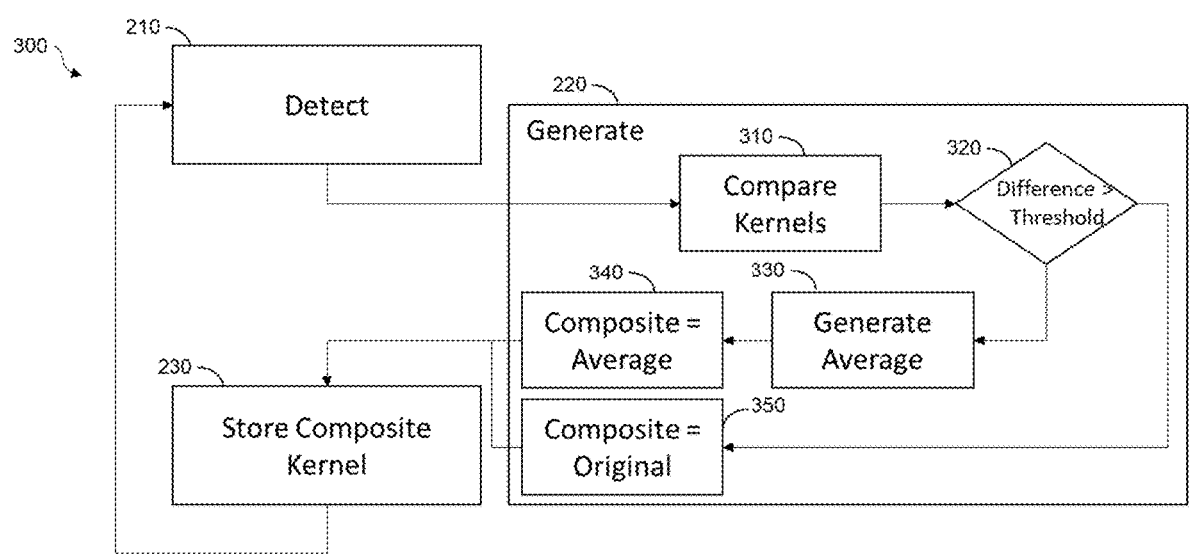
FIG. 3 is a flow diagram showing a second kernel compression method for compressing kernels according to examples.

FIG. 3 is a flow diagram showing a second kernel compression method 300 for compressing a kernel set according to examples. The kernel compression method 300 may be implemented by a kernel compression system, such as that illustrated schematically in FIGS. 6 and 7 (described below).

Items 210 and 230 of the method 300 are identical to those discussed above in relation to FIG. 2, however the step of generating the composite kernel at item 220 is different. At item 310, the kernels, for example kernels 110a, 110b, 110c and 110d of FIG. 1, in a group 110 wherein the kernels exhibit cyclic rotation, are compared and the difference between them is determined. At item 320 it is determined whether the difference between each of the kernels 110a, 110b,110c,110d exceeds a predetermined threshold. The threshold is a maximum limit indicative of a maximum difference between members of the group, such as group 110 of FIG. 1. If the difference is below the threshold, at item 330 an average kernel is generated, representing the average of the kernels 110a,110b,110c,110d. Once the average kernel is generated, at item 340 the composite kernel is made to represent the generated average kernel.

Alternatively, if at item 320 the difference does not exceed the threshold, the composite kernel is made to equal the original kernel. The threshold may be, for example, any weight in the neural network which does not change by more than two bits. Alternatively, the threshold may be the sum of different weights in a slice or volume of the kernel which does not change by a predetermined valued. It will be appreciated that the threshold may be the combination of the two options described above or may be determined using a different metric. In some embodiments where the kernels are generated using the method described in relation to FIG. 3, the network may be implemented using some or all of the training data to determine whether the threshold is correctly set, and if there is a significant change in the result.

Once it is determined whether the composite kernel is equal to an average of the kernels or the composite kernel is equal the original kernel, as described above in relation to FIG. 2, at item 230, the composite kernel is stored in a new kernel set. As with method 200 described above, the method 300 loops and detects the next group of replicated kernels, for example group 112 in FIG. 1. This continues until all replicated kernels have been detected and either stored in the new kernel set, or a composite kernel has been generated and stored in the new kernel set. All remaining kernels, that being those which do not exhibit any cyclic rotation when compared to other kernels in the kernel set, are also added to the new kernel set.

Figure 4:
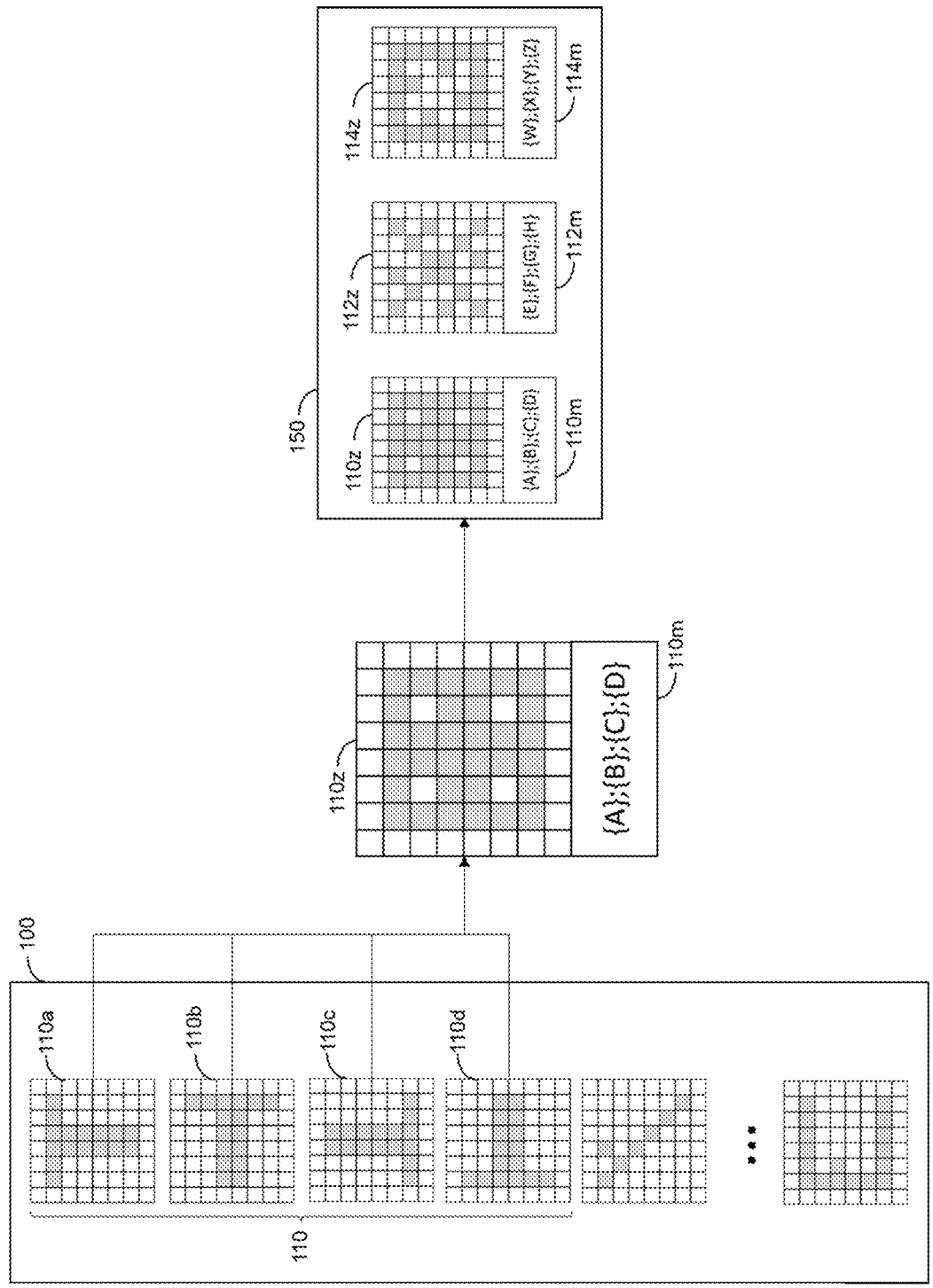
FIG. 4 is a representation of kernel data as processed by the methods shown in FIGS. 2-3 according to examples.

FIG. 4 is a representation of kernel data as processed by methods 200, 300 shown in FIGS. 2-3 according to examples. The methods 200,300 may be implemented by a kernel compression system, such as that illustrated schematically in FIGS. 6 and 7 (described below).

FIG. 4 shows an input kernel set 100, such as the one described above in relation to FIG. 1. The input kernel set 100 may comprise groups 110 of kernels 110a,110b,110c, 110d. Kernels of each group (for example, group 110) of the input kernel set 100 may exhibit cyclic rotation such as kernels 110a, 110b, 110c, and 110d which are replicated with 0, 90, 180, and 270-degree rotation. It will be appreciated that other rotation may be used, for example 45-degree rotation, or mirroring. The input kernel set 100 also comprises other groups as indicated in FIG. 1. It will also be appreciated that the input kernel set 100 may comprise kernels which exhibit no cyclic rotation, and/or other cyclic rotations. The input kernel set 100 is provided as an input to the methods 200,300, and average kernels 110z for each kernel group are generated.

In FIG. 4, the average kernel 110z is shown as a combination of the different cyclic rotations of each of the input kernels 110a,110b,110c,110d of each group 110 of the input kernel set 100. However, it will be appreciated that the average kernel 110z may be generated using a plurality of different functions, such as a concatenation of weights, a summation of weights, a multiplication of the weights, the generation of a minimum value, and the generation of a maximum value.

Along with each average kernel, for example 110z, meta data 110m is also produced. The meta data 110m indicates whether the kernel is rotated. The average kernel 110z and meta data 110m is stored in a new kernel set 150 along with average kernels 112z,114z and meta data 112m,114m for other groups of replicated kernels in the kernel set. Storing kernels in this way may result in an approximately 75% reduction of memory requirements.

When implementing the neural network, for example using the neural network to identify/classify items in an image, each kernel 110z,112z114z of the new kernel set 150 is processed. The kernel 110z,112z,114z and the meta data 110m,112m,114m are fetched from storage (as will be described below). The meta data 110m,112m,114m is interrogated and it is determined whether the kernel 110z,112z, 114z exhibits cyclic rotation. If so, the kernel 110z,112z,114z may be processed for each rotation indicated in the meta data 110m,112m,114m.

For example, the meta data may be a set comprising a binary representation of the rotations, such as {0, 1, 1, 0} which would indicate that there are three kernels which exhibit cyclic rotation, the first 0 represents the unrotated kernel, the first 1 represents a 90-degree rotated kernel, the second 1 represents a 180-degree rotated kernel, and the final 0 represents that there is no 270-degree rotated kernel in the kernel set.

Figure 5:
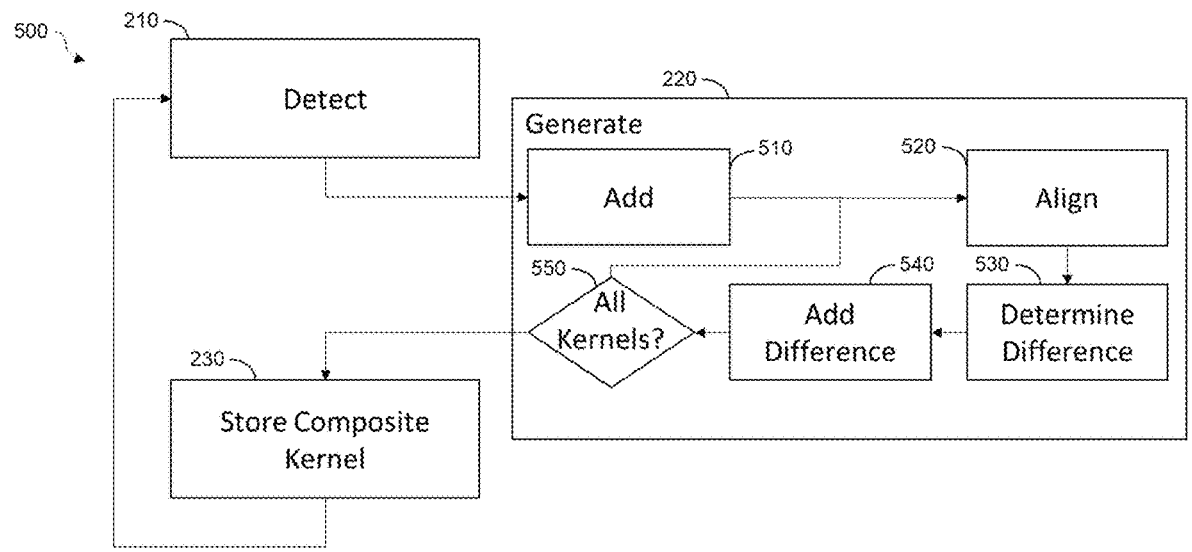
FIG. 5 is a flow diagram showing a third kernel compression method for compressing kernels according to examples.

FIG. 5 is a flow diagram showing a third kernel compression method 500 for compressing a kernel according to examples. The kernel compression method 500 may be implemented by a kernel compression system, such as that illustrated schematically in FIGS. 6 and 7 (described below).

Items 210 and 230 of the method 500 are identical to those described above in relation to FIG. 2, however the step of generating the composite kernel at item 220 is different. Once a first group, such as group 110 in FIG. 1 has been detected, at item 510 the first kernel of the group, for example kernel 110a, is stored in the new kernel set. Next, at item 520, a second kernel, for example kernel 110b, is rotated so that it aligns with the first kernel 110a. At item 530, the difference between the aligned kernel (for example, rotated kernel 110b) and the first kernel is determined, and a delta kernel is produced. At item 540, the delta kernel is added to the new kernel set.

At item 550, it is determined whether all kernels from the group have been, if not, then the method loops back to item 520, where further kernels, for example kernel 110c, is aligned with the first kernel, a delta kernel is produced and stored within the new kernel set.

Once all kernels from the group the method loops back to item 210 where a next group, such as group 112, is detected and the process is repeated. Once all groups of kernels have been processed, any remaining kernels in the original kernel set, that do not exhibit cyclic rotation are added to the new kernel set, without processing.

In some embodiments, the delta kernel may be compressed, for example using a lossless compression algorithm such as Rice-Golumb coding, to further reduce the memory requirement of the method. As mentioned above reducing the amount of memory required for the method has additional benefits. In particular, it reduces the network size and the number of memory fetches required, thereby reducing the power requirements of implementing the neural network.

When implementing the neural network, for example for identifying/classifying items in an image, when the new kernel set has been generated using the method 500 described above in relation to FIG. 5, the first kernel (for example 110a from FIG. 1) is fetched from storage. For each other member of the group, such as group 110 from FIG. 1, the delta kernel generated at step 530 is fetched from storage. The delta kernel is used to update the first kernel and is then used by the neural network. For example, the meta data may be a set comprising a binary representation of the delta kernel information, such as {0, 1, 0}, wherein the first 0 indicates that there is no 90-degree rotated delta kernel associated with the kernel, however, the 1 indicates that the 180-degree rotation has delta data associated with the kernel, and the second 0 indicates that there is no 270-degree rotated delta kernel. Once it is determined whether there a delta kernel associated with a rotation, the composite kernel is rotated by the appropriate amount, such as 180-degrees in the example described above, and the delta kernel is applied to the composite kernel.

The neural network may be processed, for example, on a neural network accelerator, or other processor designed to process neural networks. The detection of replicated kernels may occur during the training process, for example whilst training a neural network, on the neural network accelerator and/or neural network processor. In this embodiment, any kernels that exhibit 90-degree cyclic rotation in comparison to other kernels may be detected, grouped together, and then processed further as described above.

In an alternative embodiment, the kernel set may be processed prior to training the neural network. The neural network accelerator may include an interface via which inputs to the neural network may be received, for example from other components of a computer device.

Figure 6:
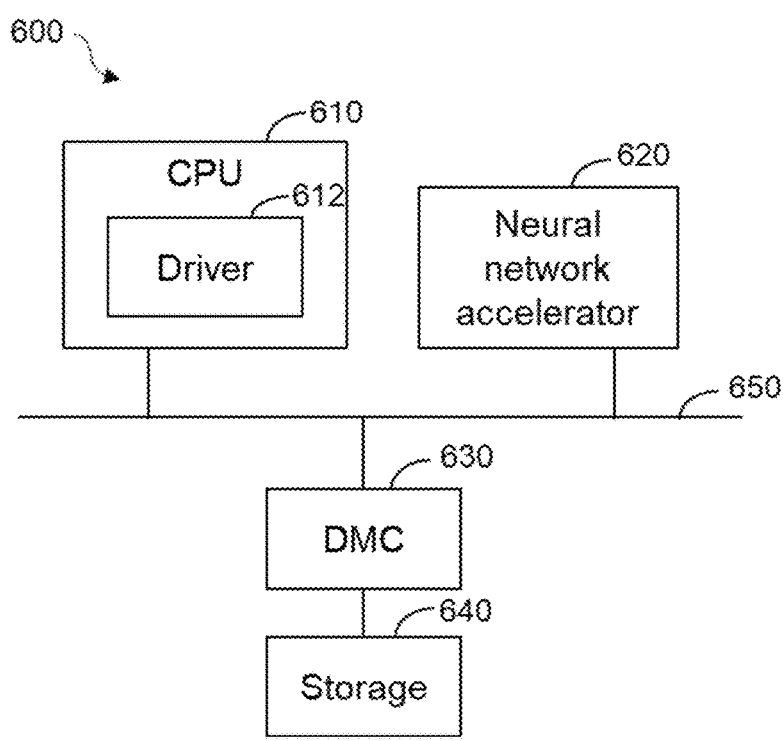
FIG. 6 shows schematically a computer device for use with a kernel compression method according to examples.

FIG. 6 shows schematically a computer device 600 for use with a kernel compression method according to examples. The computer device 600 includes at least on processor. In this example, the computer device 600 includes a central processor unit (CPU) 610. The computer device 600 also includes a neural network accelerator 620, which is a processor dedicated to implementing the classification of data using a neural network. In other examples though, the computer device 600 may include other or alternative processors such as a microprocessor, a general-purpose processor, a digital signal processor (DSP), an application specific integrated circuit (ASIC), a field programmable gate array (FPGA), neural network accelerator (NNA), neural network processor (NNP), or other programmable logic device, a discrete gate or transistor logic, discrete hardware components, or any suitable combination thereof designed to perform the functions described herein. The computer device 600 may also or alternatively include a processor implemented as a combination of computing devices, for example a combination of a DSP and a microprocessor, a plurality of microprocessors, one or more microprocessors in conjunction with a DSP core, or any other such configuration. The computer device 600 may also or alternatively include at least one graphics processing unit (GPU).

The CPU 610 of FIG. 6 includes a driver 612 which, for example, provides an interface between software configured to control or configure the neural network and the neural network accelerator, which is configured to perform the processing to implement the neural network. In other examples, the neural network may be implemented using a more general processor, such as a CPU or a GPU.

In the alternative embodiment described above, the driver 612 of the CPU 610 may be configured to process, using the CPU 610, the kernel set to produce the new kernel set prior to the training of the network in accordance with any of the methods 200,300,500 previously described in relation to FIGS. 2, 3, and 5. Thereby removing the requirement to retrain the neural network using the new kernel set.

The computer device 600 also includes a dynamic memory controller (DMC) 630 which may be used to control access to storage 640 of the computer device 600. The storage 640 is for example external to the neural network accelerator 620 and may be a random-access memory (RAM) such as DDR-SDRAM (double data rate synchronous dynamic random-access memory). In other examples, the storage 640 may be or include a non-volatile memory such as Read Only Memory (ROM) or a solid-state drive (SSD) such as Flash memory. The storage 40 in examples may include further storage devices, for example magnetic, optical or tape media, compact disc (CD), digital versatile disc (DVD) or other data storage media. The storage 640 may be removable or non-removable from the computer device 104. In some embodiments, the storage may be used for storing the original and new kernel sets. Alternatively, the original and new kernel sets may be stored in on-chip memory within the neural network accelerator 620, or other component of the computer device 600.

The components of the computer device 600 in the example of FIG. 6 are interconnected using a systems bus 650. This allows data to be transferred between the various components. The bus 650 may be or include any suitable interface or bus. For example, an ARM® Advanced Microcontroller Bus Architecture (AMBA®) interface, such as the Advanced eXtensible Interface (AXI), may be used.

Figure 7:
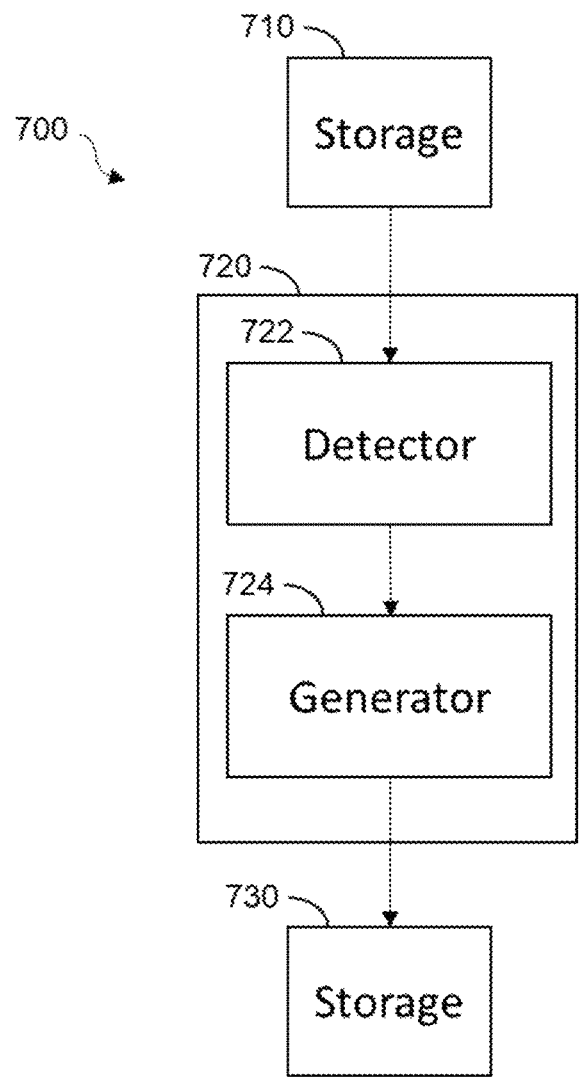
FIG. 7 shows schematically a kernel compression system according to examples.

FIG. 7 shows schematically a kernel compression system 700 according to examples. The kernel compression system 700, may form part of a neural network accelerator, such as the neural network accelerator 620 of FIG. 6, alternatively, the kernel compression system may form part of a separate processor, such as the CPU 610, or Driver 612 of FIG. 6, or even a GPU.

The system 700 comprises storage 710 for holding a plurality of kernels generated by training of a neural network. The kernels may exhibit cyclic rotation. The system 700 also comprises a compression module 720, further comprising a detection module 722 and a generation module 724. The detection module 722 retrieves kernels from the storage 710, and is arrange to determine whether any of the kernels exhibit cyclic rotation. Once kernels exhibiting cyclic rotation have been detected, the generation module 724 is arranged to produce an average/composite kernel. This average/composite kernel, as described above, is also stored with meta data indicating whether the kernel exhibits cyclic rotation.

Once the generation module 724 has produced an average/composite kernel, it is stored in further storage 730 as part of the new kernel set, for use when implementing a convolutional neural network. The further storage 730 may be the same as the storage 710 holding the original kernels, or alternatively, may by separate storage.

The order of processing steps in the examples described above are merely examples. In other examples, these processing steps may be performed in a different order.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A method of compressing kernels of a neural network trained for a particular purpose; the method comprising:
   detecting a plurality of replicated kernels, wherein the plurality of replicated kernels exhibit cyclic rotation;
   generating a plurality of composite kernels from the plurality of replicated kernels, the composite kernels comprising kernel data and meta data, wherein generating the plurality of composite kernels comprises determining differences between first replicated kernels and second replicated kernels of the plurality of replicated kernels, wherein at least one of the differences exceeds a predetermined threshold that is indicative of a maximum between the plurality of replicated kernels, and at least one of the differences is less than the predetermined threshold,
   wherein at least one of the generated plurality of composite kernels is the second replicated kernel for the at least one of the differences that exceeds the predetermined threshold, and at least one other of the plurality of composite kernels is set to an average of the plurality of replicated kernels for the at least one of the differences that is less than the predetermined threshold; and
   storing the plurality of composite kernels.

2. The method of compressing kernels according to claim 1, wherein the replicated kernels exhibit 90-degree cyclic rotation.

3. The method of compressing kernels according to claim 1, wherein a first of the replicated kernels is a mirror of a second of the replicated kernels.

4. The method of compressing kernels according to claim 1, wherein the meta data is indicative of the cyclic rotation of the plurality of replicated kernels.

5. The method of compressing kernels according to claim 1, wherein the step of generating the plurality of composite kernels comprises producing an average kernel based upon the replicated kernels.

6. The method of compressing kernels according to claim 1, wherein at least one of the plurality of composite kernels comprises a first kernel of the plurality of replicated kernels.

7. The method of compressing kernels according to claim 6, wherein for each of the plurality of replicated kernels, the step of generating the plurality of composite kernels comprises:
   aligning a second kernel of the plurality of replicated kernels with the first kernel of the plurality of replicated kernels;
   determining a delta kernel, wherein the delta kernels is indicative of the difference between the first kernel and the aligned second kernel; and
   setting at least one of the composite kernels to the delta kernel.

8. The method of compressing kernels according to claim 7, wherein the step of generating the plurality of composite kernels further comprises the step of compressing the delta kernel.

9. The method of compressing kernels according to claim 1, wherein the step of detecting a plurality of replicated kernels occurs during a training phase of a convolutional neural network.

10. The method of compressing kernels according to claim 9, further comprising a step of retraining the convolutional neural network using the plurality of composite kernels.

11. The method of compressing kernels according to claim 1, wherein the step of detecting a plurality of replicated kernels occurs prior to a training phase of a convolutional neural network.

12. A method of implementing a convolutional neural network using compressed kernels, the method comprising the steps of:
   extracting a kernel from the compressed kernels, wherein the kernel comprises kernel data and meta data;
   interrogating the meta data to determine any cyclic rotations;
   applying the cyclic rotations to the kernel data to produce one or more rotated kernels; and
   implementing the convolutional neural network using the one or more rotated kernels,
   wherein the compressed kernels are produced by a method according to claim 1.

13. A system for compressing kernels, the system comprising:
   a detection module for detecting a plurality of replicated kernels, wherein the plurality of replicated kernels exhibit cyclic rotation;
   a generation module for generating composite kernels from the plurality of replicated kernels, wherein generating the composite kernels comprises determining differences between first replicated kernels and second replicated kernels of the plurality of replicated kernels, wherein at least one of the differences exceeds a predetermined threshold and at least one of the differences is less than the predetermined threshold,
   wherein at least one of the generated composite kernels is the second replicated kernel for at least one of the differences that exceeds the predetermined threshold, and at least one other of the generated composite kernels is set to an average of the plurality of replicated kernels for the at least one of the differences that is less than the predetermined threshold, wherein the predetermined threshold is indicative of a maximum difference between the plurality of replicated kernels; and
   storage for storing at least one of the composite kernels.

14. The system of compressing kernels according to claim 13, wherein the replicated kernels exhibit 90-degree cyclic rotation.

15. The system of compressing kernels according to claim 13, wherein a first of the replicated kernels is a mirror of a second of the replicated kernels.

16. The system for compressing kernels according to claim 13, wherein the detection module is a driver of a processing unit.

17. A non-transitory computer-readable storage medium comprising computer-executable instructions stored thereon which, when executed by at least one processor, cause the at least one processor to compress kernels the instructions comprising:
   detecting a plurality of replicated kernels, wherein the plurality of replicated kernels exhibit cyclic rotation;
   generating composite kernels from the plurality of replicated kernels, the composite kernels comprising kernel data and meta data, wherein generating the composite kernels comprises determining differences between first replicated kernels and second replicated kernels of the plurality of replicated kernels, wherein at least one of the differences exceeds a predetermined threshold and at least one of the differences is less than the predetermined threshold,
   wherein at least one of the generated composite kernels is the second replicated kernel for at least one of the differences that exceeds the predetermined threshold, and at least one other of the generated composite kernels is set to an average of the plurality of replicated kernels for the at least one of the differences that is less than the predetermined threshold, wherein the predetermined threshold is indicative of a maximum difference between the plurality of replicated kernels; and storing at least one of the composite kernels.

* * * * *